Dec. 5, 1961  W. J. METZGER  3,011,656
CAR COUPLER
Filed June 29, 1959  2 Sheets-Sheet 1
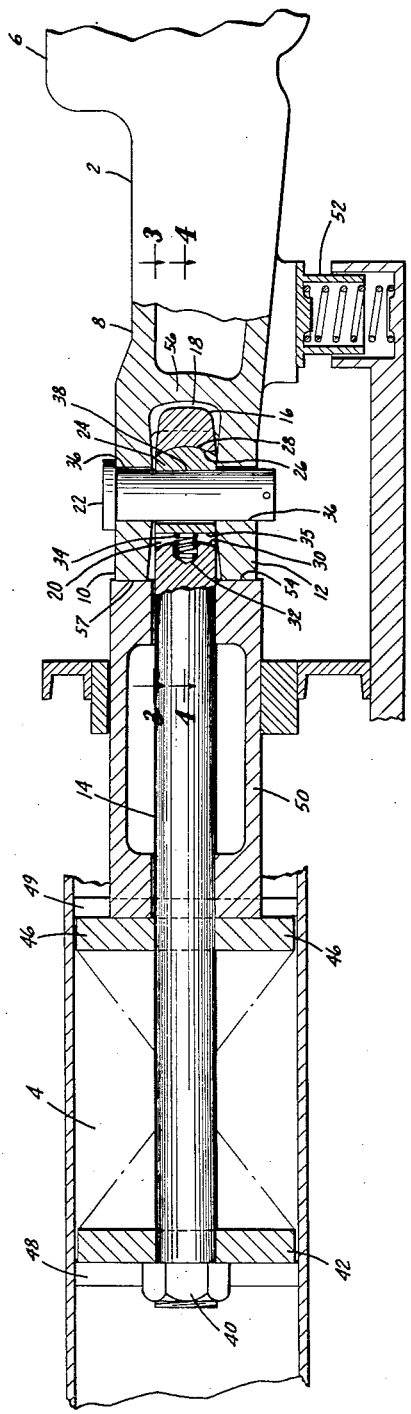
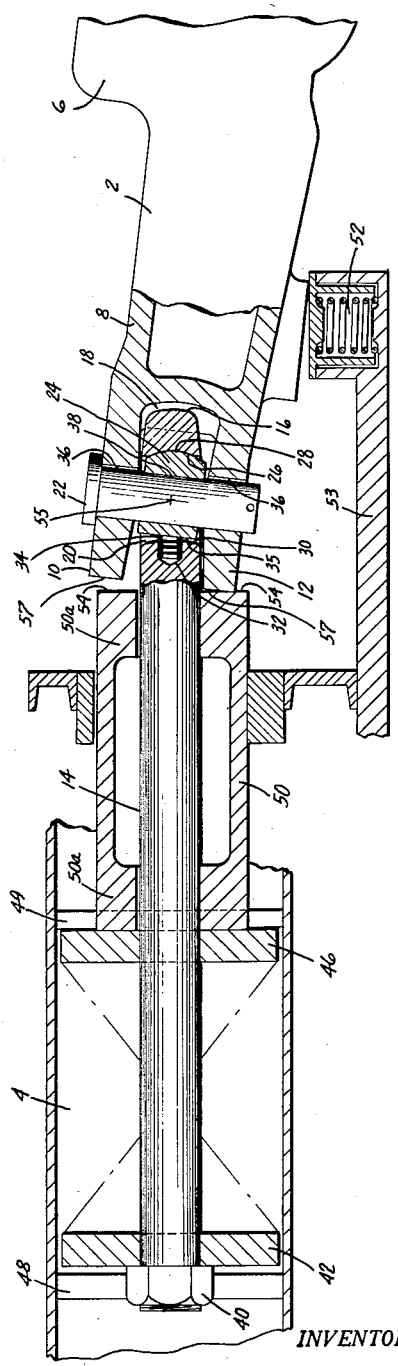
INVENTOR.
BY WILLIAM J. METZGER
Henry Kozak
ATTORNEY Dec. 5, 1961  W. J. METZGER  3,011,656
CAR COUPLER Filed June 29, 1959  2 Sheets-Sheet 2

INVENTOR.
BY WILLIAM J. METZGER
Henry Kozak
ATTORNEY

United States Patent Office 3,011,656
Patented Dec. 5, 1961

3,011,656
CAR COUPLER
William J. Metzger, East Cleveland, Ohio, assignor to National Castings Company, a corporation of Ohio
Filed June 29, 1959, Ser. No. 823,629
3 Claims. (Cl. 213—19)

This invention relates to a novel and improved coupler shank and draft gear connection for railway cars, and more particularly to the provision for vertical and horizontal angling of the coupler at the connection, and means for transmitting buff and draft forces through the connection.

A general object of this invention is to provide a novel structure whereby a railway car coupler may freely angle vertically or horizontally relative to the tail bolt of an associated draft gear.

Another object of this invention is to provide a connection between the coupler shank and the draft gear tail bolt wherein the shank and tail bolt are provided with openings for receiving a pin and novel bushing connecting the shank to the tail bolt so as to permit the coupler to freely angle vertically or horizontally.

A further object is to provide a novel connection between a coupler shank and a draft gear tail bolt in which a sleeve member is mounted on the tail bolt for transmitting buff forces from the shank to the draft gear.

Another object is to provide a hollow cylinder-like bushing on a pin loosely connecting the coupler shank to a draft gear tail bolt, the bushing having a forward-facing convex surface complemental to a concave surface in the aperture of the tail bolt so as to enable the coupler shank to effectively transmit draft forces to the draft gear tail bolt at various positions of vertical and horizontal angling of the coupler head.

These and other objects of the invention will be apparent to those skilled in the art from a study of the following description and accompanying drawings, in which:

FIGURE 1 is a longitudinal vertical sectional view of a coupler shank and draft gear embodying the invention.

FIGURE 2 is a vertical sectional view of a coupler shank and draft gear embodying the invention, showing the coupler shank angled in a vertical plane.

Figure 3:
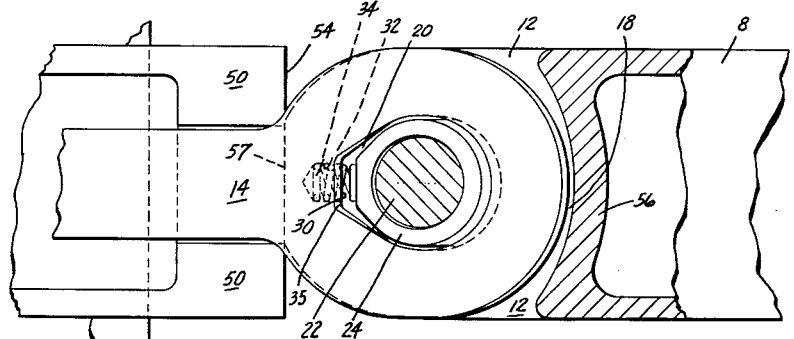
FIGURE 3 is an enlarged horizontal sectional view of a coupler shank and draft gear connection embodying the invention and taken along line 3—3 of FIG. 1.
Figure 4:
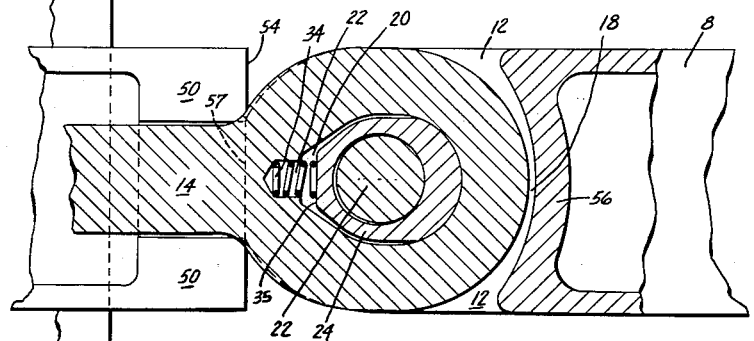
FIGURE 4 is an enlarged horizontal sectional view of a coupler shank and draft gear connection embodying the invention taken along line 4—4 of FIG. 1.

Referring to FIGURES 1 and 2 there is shown a railway car coupler 2 and associated draft gear 4 disposed in a railway car center sill. The car coupler has the usual head 6 and shank 8 integrally formed. The shank in this embodiment is bifurcated to form an upper branch 10 and a lower branch 12. A tail bolt 14 of a type usually employed in draft gear construction, extends through the draft gear and has its forward end 16 disposed in opening 18 formed by the upper and lower branches of the coupler shank.

The tail bolt has near its forward end 16 an aperture 20 so shaped as to accommodate a vertical connecting pin 22 and bushing 24. The pin 22 serves as a connecting means between the coupler shank and draft gear tail bolt and is used to transmit draft forces from the coupler head to the tail bolt and associated draft gear.

The forward end of the tail bolt aperture 20 has an arcuately curved rearwardly facing concave surface 26 that is in slidable engagement with the complemental forwardly facing convex surface 28 on the bushing. Surfaces 26 and 28 permit the pin, pushing and related coupler to angle in a vertical plane while the coupler is subjected to draft or pulling forces.

On the forward facing inner surface 30 of aperture 20 is a cylindrically shaped recess 32 oriented along the longitudinal axis of the tail bolt. A spring 34 is positioned in the recess. Bushing 24, which is disposed entirely within the confines of aperture 20, has a rearwardly facing flat surface 35 that is in engagement with the forward end of spring 34. Spring 34 being under compression exerts a force against the surface 35 to maintain the bushing in position within the aperture with its surface 28 in contact with tail bolt surface 26 to facilitate insertion of connecting pin 22 during assembly of the tail bolt with the coupler shank. The connecting pin is received in the aligned openings 36 in the branches 10 and 12 in the coupler shanks and in opening 38 in the bushing, thus connecting the coupler shank to the tail bolt.

The rearward end of the tail bolt has the usual tail bolt nut 40 threaded thereon and in abutting relationship with the rear follower 42 of the associated draft gear. Rear follower 42, like the front follower 46, is slidably mounted on the tail bolt and both are in abutting engagement with rear stops 48 and front stops 49, respectively, on the car body center sill.

A movable sleeve 50 slidably mounted on the tail bolt is disposed between the front follower 46 of the draft gear and the shank branches 10 and 12 to serve as the means by which buff forces are transmitted from the coupler shank to the draft gear.

The sleeve is preferably formed with thickened end portions as at 50a to strengthen the sleeve to better withstand the buff forces exerted upon it by the coupler.

A resilient support means 52 for the coupler head and shank is located beneath the shank. Support means 52 permits vertical angling of the coupler and serves to maintain the coupler in an approximately horizontal position when not in use. The support means is mounted on an extension arm 53 secured to the car body center sill.

FIGURE 2 illustrates the coupler head and shank angled downwardly. It is in this position that the advantages of this invention become readily apparent. In operation, when the coupler shank is angled downwardly when in draft, as is illustrated, the connecting pin 22 and the bushing 24 rotate in a vertical plane about point 55, but the forwardly facing convex surface 28 of the bushing remains in contact with the complemental rearward facing concave surface 26 in the aperture of the tail bolt.

The coupler shank, connecting pin, and bushing pivot about point 55 located in pin 22. In pivoting about point 55, lower branch 12 slides upwardly along surface 54 while upper branch 10 swings upwardly and away from surface 54 on sleeve 50. In this instance, compression of the draft gear is effected by the forward movement of rear follower 42. If the coupler were subjected to a buffing force while being angled downwardly, the rear follower 42 would remain in contact with rear stops 48 and front follower 46 would be moved rearwardly to compress the draft gear. Moreover, in buff, as will be hereinafter explained, surfaces 26 and 28 tend to separate because the buffing force is transmitted from the coupler through sleeve 50 to the draft gear. The resilient support means 52 for the coupler head and shank is depressed in response to the downward pressure of the shank under the aforementioned conditions.

With the coupler in horizontal position while subjected to a force in buff, the shank branches 10 and 12 force sleeve 50 rearwardly against front follower 46 to compress the draft gear. As the front follower moves rearward in response to buff forces applied to the tail bolt sleeve, the connecting wall 56 between the shank branches engages the forward end 16 of the tail bolt and pushes it rearward. The tail bolt offers little resistance to the buff forces and moves rearwardly to permit the tail bolt sleeve 50 abutting against the front follower 46 to compress, still more, the draft gear 4. Spring 34, disposed rearwardly of the bushing 24, offers little resistance to buff forces. The principal function of the spring is to hold bushing 24 in position during assembly.

The ends of upper and lower branches 10 and 12 are formed with flat surfaces 57 which are perpendicular to the longitudinal axis of the coupler. These surfaces serve as a centering means when the coupler is aligned horizontally or vertically. The draft gear, being in a compressed condition, exerts a restoring force on the connecting pin that pulls the pin and coupler toward the front follower and tends to align the coupler. When flat surfaces 57 on the upper and lower branches of the shank engage surface 54 on sleeve 50, the coupler is aligned vertically and horizontally along the same axis as the draft gear.

Figure 5:
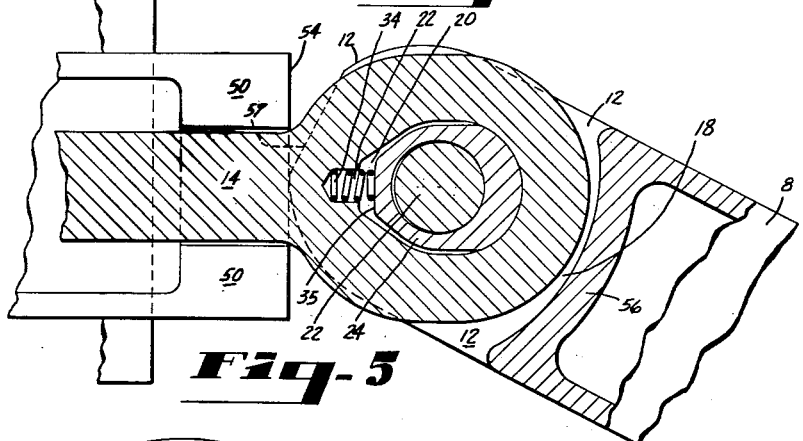
FIGURE 5 is a horizontal sectional view corresponding to FIGURE 4, showing the coupler shank angled in a horizontal plane.
Figure 6:
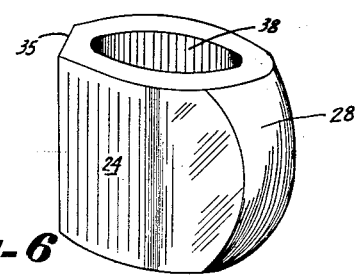
FIGURE 6 is a perspective view of the novel bushing employed in association with the coupler shank and connecting pin.

Referring to FIGURE 5, the coupler shank is illustrated as being angled in a horizontal plane. When horizontal angling takes place, the branches of the shank rotate about the connecting pin 22 as illustrated, while bushing 24 remains stationary. Any combination of vertical and horizontal angling of the coupler head and shank is resolved into rotation of the connecting pin 44 and bushing 24 about point 55 for vertical angling, and into rotation of the shank about the connecting pin for horizontal angling.

When connecting the coupler to the tail bolt, spring 34 is first inserted into the cylindrical recess 32 in the tail bolt and bushing 24 is then inserted in the tail bolt aperture 20. The spring 34 engaging the flat rearward side 35 of the bushing, holds the bushing in the aperture with surface 28 in engagement with surface 26 on the tail bolt. Sleeve 50 is then mounted on the tail bolt with one end in contact with the front follower 30 of the draft gear. The forward end 16 of the tail bolt is then inserted into opening 18 between the branches 10 and 12 of the shank. Connecting pin 22 is then inserted through openings 36 in the branches and opening 38 in bushing 24, thus completing the connection between the coupler shank and the tail bolt.

There has been disclosed, therefore, a novel means by which an automatic coupler may angle freely in a vertical or horizontal plane while coupled to a similar automatic coupler.

The terms and expressions which have been employed are used as terms of description and not of limitation and there is no intention of excluding any equivalents of the invention described or of the portions thereof as fall within the purview of the claims.

What is claimed is:

1. In combination, a car coupler having a shank member and a tail bolt member, one of said members having an opening for receiving an end of the other member, said end of the other member having an aperture adapted for receiving a bushing therein, means for operatively connecting said members, said means comprising a hollow cylinder-like bushing slidably disposed within the confines of said aperture and having an eccentrically curved convex face in abutting engagement with said apertured member, said curved face adapting said bushing or angling movement in a vertical plane, and pin means extending through said members and bushing, said pin means and said bushing moving unitarily in a vertical plane in response to vertical angling of said coupler, and means for maintaining said bushing in fixed relation to said aperture in response to horizontal angling of said coupler.

2. In the combination of claim 1, spring means disposed intermediate the rearward portion of the wall defining said aperture and said bushing, said spring means being adapted to maintain said bushing in said abutting engagement with said apertured member.

3. In combination, a car coupler having a shank member and a tail bolt member, said shank member being bifurated to receiver therebetween said tail bolt member, said tail bolt member having an eye opening in one end thereof adapted to receive therein a bushing, means for operatively connecting said tail bolt and said shank, said means comprising a cylindrically shaped bushing disposed within the confines of said eye opening, said bushing having in its forward side an eccentrically curved convex surface in engagement with and complemental to the wall defining said eye opening, and pin means extending through said shank and bushing, said curved surface on said bushing allowing said bushing to angle in a vertical plane in response to vertical angling of said coupler and constraining said bushing to remain in fixed relation relative to said tail bolt in response to horizontal angling of said coupler, resilient spring means disposed within said eye opening and arranged to abut against the rearward side of said bushing to maintain said bushing in abutting engagement with said wall.

References Cited in the file of this patent
UNITED STATES PATENTS

| | | |
|---|---|---|
| 2,220,031 | Van Dorn | Oct. 29, 1940 |
| 2,240,363 | Barrows et al. | Apr. 29, 1941 |
| 2,254,302 | Metzger | Sept. 2, 1941 |
| 2,286,590 | Van Dorn | June 16, 1942 |
| 2,469,118 | Kinne et al. | May 3, 1949 |